(12) United States Patent
Eickhoff

(10) Patent No.: US 10,859,291 B2
(45) Date of Patent: Dec. 8, 2020

(54) PARABOLIC TROUGH COLLECTOR MODULE, PARABOLIC TROUGH COLLECTOR MODULE UNIT AND SOLAR THERMAL POWER STATION

(71) Applicant: DEUTSCHES ZENTRUM FÜR LUFT- UND RAUMFAHRT E.V., Cologne (DE)

(72) Inventor: Martin Eickhoff, Gádor (ES)

(73) Assignee: DEUTSCHES ZENTRUM FÜR LUFT- UND RAUMFAHRT E.V., Cologne (DE)

( * ) Notice: Subject to any disclaimer, the term of this patent is extended or adjusted under 35 U.S.C. 154(b) by 19 days.

(21) Appl. No.: 15/545,579

(22) PCT Filed: Jan. 8, 2016

(86) PCT No.: PCT/EP2016/050292
§ 371 (c)(1),
(2) Date: Jul. 21, 2017

(87) PCT Pub. No.: WO2016/116304
PCT Pub. Date: Jul. 28, 2016

(65) Prior Publication Data
US 2018/0023845 A1   Jan. 25, 2018

(30) Foreign Application Priority Data

Jan. 23, 2015  (DE) .................. 20 2015 000 425 U

(51) Int. Cl.
*F24S 23/71*   (2018.01)
*F24S 23/74*   (2018.01)
(Continued)

(52) U.S. Cl.
CPC ............... *F24S 23/71* (2018.05); *F24S 23/74* (2018.05); *F24S 25/10* (2018.05); *F24S 30/425* (2018.05);
(Continued)

(58) Field of Classification Search
CPC .......... F24S 23/71; F24S 25/10; F24S 30/425; F24S 30/12; F24S 30/17; F24S 30/15; F24S 30/18; Y02E 10/45; Y02E 10/47
See application file for complete search history.

(56) References Cited

U.S. PATENT DOCUMENTS 160,290  A  *  3/1875  Trenchard ............... F16M 11/18
                                                  248/404
397,589  A  *  2/1889  Cutler ..................... B63H 9/06
                                                  114/102.33
(Continued)

FOREIGN PATENT DOCUMENTS

CN    102893101 A    1/2013
DE    2626842 C2    10/1977
(Continued)

OTHER PUBLICATIONS

German Search Report dated Aug. 18, 2015 in corresponding German Patent Application No. 202015000425.3; 5 pgs.
(Continued)

*Primary Examiner* — Avinash A Savani
*Assistant Examiner* — Martha M Becton
(74) *Attorney, Agent, or Firm* — Maier & Maier, PLLC

(57) ABSTRACT

A parabolic trough collector module comprising an absorber tube, a parabolic reflector focusing the solar radiation to the absorber tube and with a reflector surface, and at least one support de-vice on which the parabolic reflector is mounted so that it can pivot. The support device includes a support head projecting over the reflector surface in the vertical
(Continued)

Figure 3:
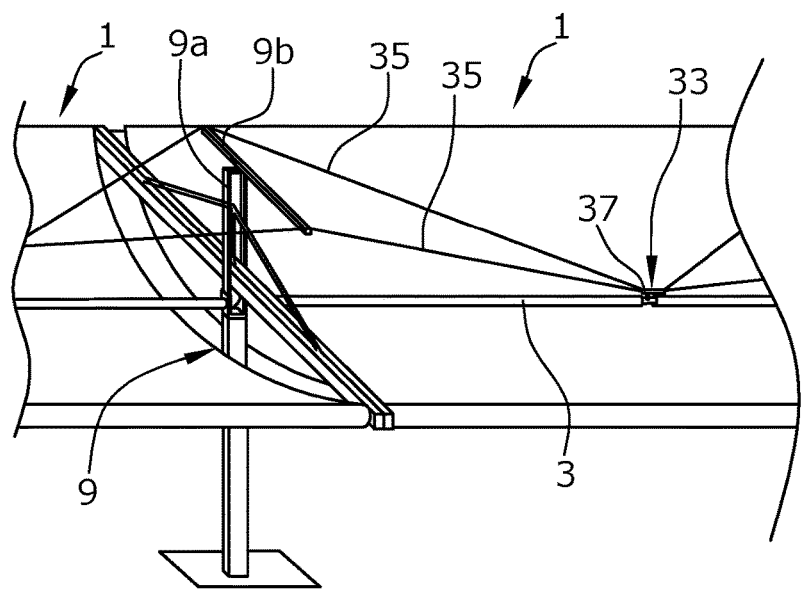

direction, on which the absorber tube is mounted by a linear bearing structure forming a linear guide.

14 Claims, 3 Drawing Sheets

(51) Int. Cl.
  *F24S 30/425* (2018.01)
  *F24S 25/10* (2018.01)
  *F24S 30/00* (2018.01)
(52) U.S. Cl.
  CPC ........ *F24S 2030/12* (2018.05); *F24S 2030/17* (2018.05); *F24S 2030/18* (2018.05); *Y02E 10/40* (2013.01); *Y02E 10/47* (2013.01)

(56) References Cited

U.S. PATENT DOCUMENTS

| | | | | |
|---|---|---|---|---|
| 431,991 A | * | 7/1890 | Perry | E04H 12/24 52/40 |
| 606,104 A | * | 6/1898 | Twining | B63B 1/14 114/39.28 |
| 708,277 A | * | 9/1902 | Warner | H02G 7/20 174/45 R |
| 811,435 A | * | 1/1906 | Perdue | E04H 12/10 52/651.01 |
| 812,344 A | * | 2/1906 | Howser | B25H 1/06 182/153 |
| 1,345,758 A | * | 7/1920 | Folsom | F24S 23/74 126/601 |
| 1,852,925 A | * | 4/1932 | Joseph | H01Q 7/02 174/145 |
| 2,128,030 A | * | 8/1938 | Koleno | E04H 17/04 256/39 |
| 2,147,501 A | * | 2/1939 | Ryder | B63B 15/02 114/39.32 |
| 2,221,919 A | * | 11/1940 | Wilder | E01D 18/00 14/19 |
| 2,301,001 A | * | 11/1942 | Wolff | E21B 47/00 384/440 |
| 2,410,245 A | * | 10/1946 | Scrivener | E04H 12/20 403/338 |
| 2,641,784 A | * | 6/1953 | Templeton | E01D 18/00 14/19 |
| 2,675,211 A | * | 4/1954 | Regoord | E04H 12/182 182/141 |
| 2,683,615 A | * | 7/1954 | Holt | H01Q 1/1235 248/354.4 |
| 2,705,061 A | * | 3/1955 | Getz | E04H 12/10 343/883 |
| 2,858,789 A | * | 11/1958 | Stearns | B63H 9/0657 114/102.12 |
| 2,889,993 A | * | 6/1959 | Willetts | F16L 27/0857 239/111 |
| 2,923,418 A | * | 2/1960 | McGuire | B66C 13/18 212/238 |
| 2,924,414 A | * | 2/1960 | Tesdal | A01M 31/00 211/191 |
| 2,960,704 A | * | 11/1960 | Stoltenburg | E01D 11/02 14/18 |
| 3,013,584 A | * | 12/1961 | Reed | E04H 12/02 138/137 |
| 3,033,529 A | * | 5/1962 | Pierrat | E04H 12/182 242/388.6 |
| 3,084,957 A | * | 4/1963 | Caldwell | F16L 27/111 285/114 |
| 3,147,829 A | * | 9/1964 | Johnson | E04H 12/182 403/365 |
| 3,148,746 A | * | 9/1964 | Joculano | E04G 1/34 108/115 |
| 3,171,403 A | * | 3/1965 | Drescher | F24S 30/40 126/603 |
| 3,242,499 A | * | 3/1966 | Fonda-Bonardi | F16L 27/0857 2/2.13 |
| 3,248,831 A | * | 5/1966 | Jones | E04H 12/182 29/897.33 |
| 3,337,188 A | * | 8/1967 | Manson | B66D 3/04 254/412 |
| 3,495,370 A | * | 2/1970 | Habro | B21C 37/151 52/118 |
| 3,503,428 A | * | 3/1970 | Ackerfeldt | B27B 15/08 83/409 |
| 3,558,257 A | * | 1/1971 | Harris | A01G 25/092 239/1 |
| 3,647,246 A | * | 3/1972 | Burtis | F16L 23/0286 285/114 |
| 3,672,572 A | * | 6/1972 | Delfs | A01G 25/092 239/731 |
| 3,731,578 A | * | 5/1973 | Ackerfeldt | B27B 29/08 83/731 |
| 3,738,687 A | * | 6/1973 | Zimmerer | F16L 27/0849 285/5 |
| 3,745,601 A | * | 7/1973 | Appelt | E01D 11/04 14/77.3 |
| 3,747,455 A | * | 7/1973 | Hartzell | B27B 7/00 83/403.1 |
| 3,767,149 A | * | 10/1973 | Hill | F16L 1/026 138/106 |
| 3,844,481 A | * | 10/1974 | Livingston | A01G 25/092 239/727 |
| 3,867,894 A | * | 2/1975 | Vicard | B63B 3/38 114/102.18 |
| 3,872,758 A | * | 3/1975 | Hartzell | B27B 29/08 105/160.5 |
| 3,937,607 A | * | 2/1976 | Rodormer | B28B 23/043 425/111 |
| 3,968,765 A | * | 7/1976 | Menegus | B63B 41/00 114/39.29 |
| 4,047,493 A | * | 9/1977 | Menegus | B63B 15/02 114/102.16 |
| 4,168,696 A | * | 9/1979 | Kelly | F24S 23/30 126/683 |
| 4,178,913 A | * | 12/1979 | Hutchison | F24S 30/425 126/601 |
| 4,243,019 A | * | 1/1981 | Severson | F24S 30/425 126/634 |
| 4,249,514 A | * | 2/1981 | Jones | F24S 30/425 126/605 |
| 4,306,540 A | * | 12/1981 | Hutchison | F24S 30/425 126/607 |
| 4,321,909 A | * | 3/1982 | Trihey | G01S 3/7861 126/581 |
| 4,333,447 A | * | 6/1982 | Lemrow | F24S 40/80 126/657 |
| 4,352,220 A | * | 10/1982 | Wittfoht | E01D 21/065 14/77.1 |
| D267,867 S | * | 2/1983 | Marsden | D12/303 |
| 4,386,600 A | * | 6/1983 | Eggert, Jr. | F24S 30/425 359/852 |
| 4,469,938 A | * | 9/1984 | Cohen | G01S 3/7861 250/203.4 |
| 4,515,100 A | * | 5/1985 | Grierson | B63H 25/04 114/111 |
| 4,515,148 A | * | 5/1985 | Boy-Marcotte | F24S 25/00 126/570 |
| 4,611,575 A | * | 9/1986 | Powell | F24S 23/745 126/605 |
| 4,625,475 A | * | 12/1986 | McGinnis | H01Q 1/1235 242/390.2 |
| 4,649,900 A | * | 3/1987 | Trihey | G01S 3/7861 126/575 |
| 4,697,487 A | * | 10/1987 | Cameron | B27B 29/085 144/378 |
| 4,809,936 A | * | 3/1989 | Whitaker | B64G 1/646 244/172.4 |
| 4,832,001 A | * | 5/1989 | Baer | H02S 20/30 126/579 |

(56) References Cited

U.S. PATENT DOCUMENTS

| | | | | |
|---|---|---|---|---|
| 4,866,893 A * | 9/1989 | McGinnis | E04H 12/18 52/108 |
| 4,995,272 A * | 2/1991 | Reed, III | F16F 15/02 73/663 |
| 5,011,001 A * | 4/1991 | Cameron | B27B 29/08 198/468.01 |
| 5,058,565 A | 10/1991 | Gee et al. | |
| 5,071,243 A * | 12/1991 | Bronstein | G02B 7/183 359/867 |
| 5,134,827 A * | 8/1992 | Hartman | E04D 3/366 52/584.1 |
| 5,191,876 A * | 3/1993 | Atchley | G01S 3/786 126/576 |
| D392,397 S * | 3/1998 | Werber | D25/126 |
| 5,850,652 A * | 12/1998 | Yamamura | E01D 11/00 14/18 |
| 6,080,927 A * | 6/2000 | Johnson | F24S 20/20 136/248 |
| 6,104,910 A * | 8/2000 | Koths | H04B 7/155 343/878 |
| 8,056,555 B2 * | 11/2011 | Prueitt | F24S 23/71 126/696 |
| 8,333,186 B2 * | 12/2012 | Jennings | B21D 53/02 126/694 |
| 8,536,441 B2 * | 9/2013 | Giacalone | F24S 23/74 136/248 |
| 8,919,051 B1 * | 12/2014 | Echemendia | E02D 27/42 52/146 |
| 9,605,876 B2 * | 3/2017 | Sauerborn | F24S 23/80 |
| 9,608,155 B1 * | 3/2017 | Ingram | H01L 31/0521 |
| 9,726,401 B2 * | 8/2017 | Sauerborn | F24S 10/45 |
| 9,806,669 B2 * | 10/2017 | Michotte De Welle | H02S 20/32 |
| 9,845,824 B2 * | 12/2017 | Lamb | F16C 13/04 |
| 10,197,193 B2 * | 2/2019 | Fournel | F16L 59/141 |
| 10,309,688 B2 * | 6/2019 | Binder | F24S 23/74 |
| 2007/0274618 A1 * | 11/2007 | Sandin | B65G 49/063 384/212 |
| 2008/0247069 A1 * | 10/2008 | Bronstein | F24S 23/745 359/871 |
| 2010/0258186 A1 * | 10/2010 | Harrenstien | H01L 31/0547 136/259 |
| 2010/0319684 A1 * | 12/2010 | Almogy | F24D 11/003 126/714 |
| 2011/0036345 A1 * | 2/2011 | Almogy | F24D 11/003 126/714 |
| 2011/0162692 A1 * | 7/2011 | Giacalone | F24S 23/74 136/248 |
| 2011/0240006 A1 * | 10/2011 | Linke | F24S 30/425 126/600 |
| 2011/0279918 A1 * | 11/2011 | Almogy | H01L 31/0521 359/872 |
| 2011/0291405 A1 | 12/2011 | Bürger et al. | |
| 2012/0151852 A1 * | 6/2012 | Thoren | E04H 12/182 52/111 |
| 2012/0151853 A1 * | 6/2012 | Thoren | E04H 12/182 52/111 |
| 2012/0152233 A1 * | 6/2012 | Masuda | F24S 30/425 126/606 |
| 2013/0048582 A1 * | 2/2013 | Kruse | F24S 30/428 211/41.1 |
| 2013/0056000 A1 * | 3/2013 | Perrin | F24S 40/80 126/606 |
| 2014/0034042 A1 * | 2/2014 | Marcotte | B21D 53/08 126/600 |
| 2014/0140755 A1 * | 5/2014 | Clavijo Lumbreras | F16C 11/0695 403/57 |
| 2014/0182578 A1 * | 7/2014 | Fortin | G02B 7/198 126/600 |
| 2014/0196764 A1 * | 7/2014 | Clavelle | H02S 20/30 136/248 |
| 2014/0216522 A1 * | 8/2014 | Au | H02S 20/32 136/246 |
| 2014/0270740 A1 * | 9/2014 | O'Rourke | F24H 1/105 392/478 |
| 2014/0345602 A1 * | 11/2014 | Takashima | F24S 23/82 126/694 |
| 2014/0360487 A1 * | 12/2014 | Sauerborn | F24S 40/80 126/651 |
| 2014/0360490 A1 * | 12/2014 | Sauerborn | F24S 10/45 126/694 |
| 2015/0059826 A1 * | 3/2015 | Reed | H02S 20/32 136/246 |
| 2016/0040910 A1 * | 2/2016 | Ashida | F24S 23/745 126/600 |
| 2016/0124067 A1 * | 5/2016 | Paponneau | F16H 19/08 250/203.4 |
| 2017/0237391 A1 * | 8/2017 | Michotte De Welle | H02S 20/32 248/372.1 |
| 2017/0314816 A1 * | 11/2017 | Binder | F24S 10/45 |

FOREIGN PATENT DOCUMENTS

| | | |
|---|---|---|
| DE | 202009005056 U1 | 10/2009 |
| DE | 102009039021 A1 | 7/2011 |
| DE | 102013112607 A1 | 1/2015 |
| GB | 2235786 A | 3/1991 |
| WO | 2010018166 A2 | 2/2010 |
| WO | 2011141737 A2 | 11/2011 |
| WO | 2015089273 A1 | 6/2015 |

OTHER PUBLICATIONS

International Search Report and the Opinion dated Sep. 30, 2016 from corresponding International Patent Application No. PCT/EP2016/050292; 17 pgs.

Chinese Office Action dated Oct. 26, 2018, in connection with corresponding CN Application No. 201680006446.2 (6 pgs., including machine-generated English translation).

* cited by examiner

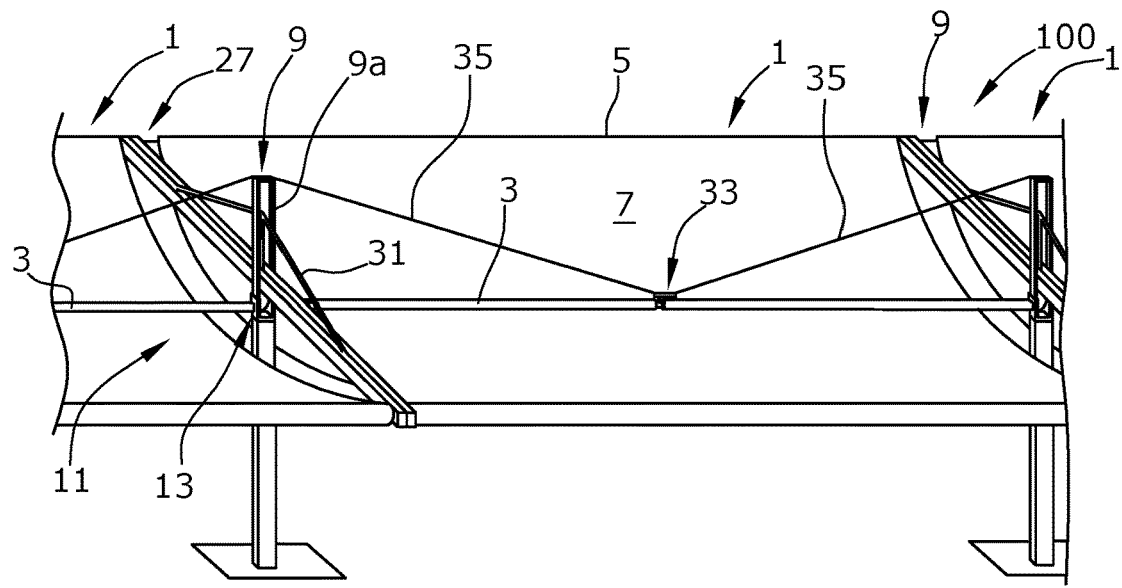
Fig.1
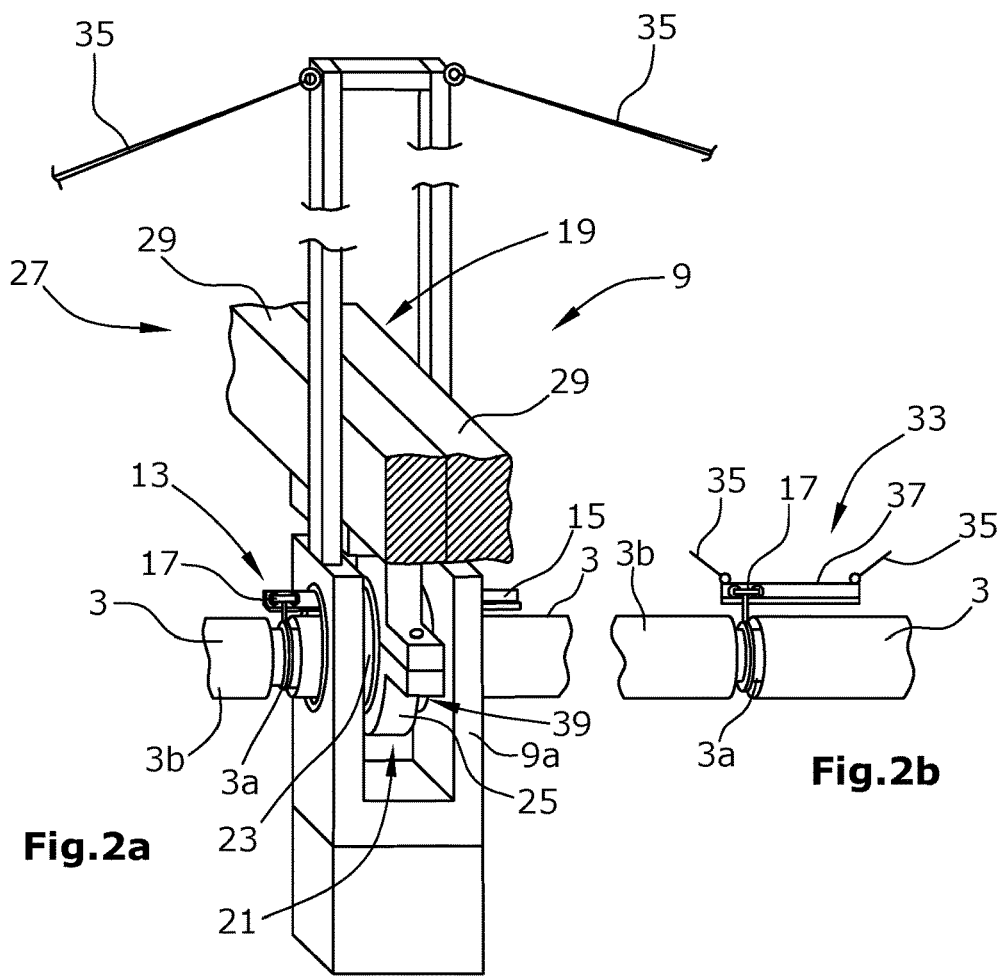
Fig.2a  Fig.2b

PARABOLIC TROUGH COLLECTOR MODULE, PARABOLIC TROUGH COLLECTOR MODULE UNIT AND SOLAR THERMAL POWER STATION

The present invention relates to a parabolic trough collector module comprising an absorber tube, a parabolic trough reflector focusing solar radiation onto the absorber tube and having a reflector surface, and at least one support device on which the parabolic reflector is mounted pivotably. The invention further relates to a parabolic trough collector module unit with a plurality of parabolic trough collector modules, as well as to a solar power station comprising a plurality of parabolic trough collector units.

Solar thermal power stations use the energy of sun light to heat a heat carrier medium, wherein the heat is often used for power generation. Optical concentrators are used to focus solar radiation onto an absorber in which the heat carrier medium circulates. The optical concentrators represent the largest investment item of solar thermal power plants and have a decisive influence on their efficiency.

Known solar thermal power stations comprise parabolic trough collectors. A parabolic trough collector comprises an elongate collector structure with a parabolic cross section. Typical aperture openings are 5-7 m. Individual parabolic trough collector modules, which are also referred to as "solar collector elements" (SCE), have a length of about 12 m. A plurality of such modules is combined into parabolic trough collector units which are generally orientated in a north/south direction. The modules of a unit are conventionally pivoted together so that the parabolic trough reflectors can track the position of the sun. The centre of gravity axis of the modules, and thus the axis of rotation of the modules, is situated near the vertex of the parable and thus at a distance from the absorber tube. Therefore, the absorber tube is conventionally guided along during pivoting. To make this possible, the absorber tubes are connected directly to the parabolic reflector or the support structure of the parabolic reflector via special absorber tube holders. Therefore, flexible absorber tube connectors are required between two independently movable parabolic trough collector modules, which connectors are realized by means of so-called ball joint connecting lines or swivel joint connecting lines. Such connecting lines are complicated to construct and relatively costly. Further, the flexible absorber tube connectors cause a pressure drop and heat losses. Moreover, the support structure of the parabolic reflector must be solid and stable in order to absorb the great weight forces of the absorber tube. Since the parabolic reflectors represent the largest investment item, a stable structure of these parabolic reflectors leads to a significant increase in investment costs.

Further, for thermal reasons, the absorber tubes expand while heating by means of solar radiation. The absorber tube holders therefore have to compensate for the axial elongation of the absorber tubes. For this reason it is usually provided that the absorber tube holders are tiltably connected to the parabolic reflector by a hinge or a spring sheet. By tilting the absorber tube holder, the distance between the parabolic reflector and the absorber tube changes so that the absorber tube can be shifted out of the focus of the parabolic reflector if the absorber tube holders are tilted too much. Thereby, the maximum length of the parabolic trough collector units and series of parabolic trough collector units is limited. In addition, each end of a collector unit or a series of collector units has to be provided with compensation devices for compensating the axial elongation of the absorber tube. These devices cause increased investment costs and further also lead to pressure losses and heat losses during operation.

Further, so-called fixed focus collectors are known in which the parabolic reflector is pivoted about the absorber tube. In such collectors, the absorber tube is not pivoted along so that the high-cost absorber tube connectors between two parabolic trough collector units can be omitted. However, the absorber tubes are still connected directly with the parabolic reflector or the parabolic reflector support structure via absorber tube holders, with the problems of the absorber tube holders, however, still existing.

Therefore, it is an object of the present invention to provide a parabolic trough collector module, a parabolic trough collector unit, as well solar thermal power station in which the investment costs for the parabolic trough collector modules are reduced and a higher power yield is achieved due to reduced losses in heat and pressure.

A parabolic trough module according to the present invention is defined. A parabolic trough collector unit according to the present invention is defined. A solar thermal power station according to the present invention is defined.

In a parabolic trough collector module according to the present invention comprising an absorber tube, a parabolic reflector focusing solar radiation on the absorber tube and having a reflector surface, and comprising at least one support device on which the parabolic reflector is pivotably supported, it is provided that the support device has a support head projecting beyond the reflector surface in the vertical direction, on which the absorber tube is mounted by means of a linear bearing structure forming a linear guide. The invention thus provides that the absorber tube is supported on the support device and thus the weight force of the absorber tube and of the heat carrier medium contained therein in operation is absorbed by the support device. In this manner an absorber tube separated from the parabolic reflector may be provided so that the demands on the parabolic reflector are reduced with a view to stability and solidity. Because of that, the parabolic reflector can be produced at lower costs. By providing a linear bearing structure forming a linear guide, the absorber tube, when heated, may expand without restraint, since the absorber tube may slide through the linear bearing structure corresponding to the elongation caused by the influence of the heat. In this manner, even under thermal expansion, the absorber tube remains at the same distance from the reflector surface of the parabolic reflector and complex tilting structures are avoided. In the parabolic trough collector module it is possible to advantageously provide a so-called fixed focus structure in which the absorber tube is not pivoted when the parabolic reflector is pivoted. Thereby, the high-cost flexible connectors between two parabolic trough collector modules are avoided.

The support device may be formed by a support, e.g. a pylon.

The absorber tube may consist of an inner tube through which the heat carrier medium is passed in operation, and a sheathing tube. The sheathing tube is transparent to solar radiation. The gap formed between the inner tube and the sheathing tube may be evacuated. Heat losses can be reduced due to the sheathing tube and the evacuated gap.

Preferably it is provided that the parabolic reflector is pivotably supported by a radial bearing structure arranged around the absorber tube or around the absorber tube and the linear bearing structure. Using such a radial bearing structure, a bearing structure for the parabolic reflector may be provided in a structurally simple manner, in which bearing structure the rotary axis extends on the centre axis of the absorber tube so that the parabolic reflector is pivoted about the absorber tube. The absorber tube or the absorber tube and the linear bearing structure are advantageously passed through the radial bearing structure. In particular it may be provided that both the inner tube and the sheathing tube of the absorber tube are passed through the radial bearing structure. For this purpose, the support device may e.g. comprise a tube section through which the absorber tube or the absorber tube and the linear bearing structure are passed, with the radial bearing structure being arranged on the lateral surface of the tube section.

By such a design of the radial bearing structure it is advantageously achieved that a connection to the absorber tube can be made if the parabolic trough collector module is an outer module of a long row of modules, or that the absorber tube can be continued at an adjacent parabolic trough collector module.

In a particularly preferred embodiment of the invention it is provided that the support device is connected to at least one absorber tube mount by at least one mounting means, the absorber tube mount being arranged at a section of the absorber tube located above the reflector surface and forms an absorber tube mount displaceable with respect to the absorber tube in the axial direction of the absorber tube. The absorber tube mount may e.g. be located at the centre of an absorber tube associated to a parabolic trough collector module of the present invention. In particular it may be provided that the absorber tube mounts fastened exclusively to the mounting means and the absorber tube. Weight forces of the absorber tube and of the heat carrier medium contained therein in operation may thus be transmitted onto the support device via the absorber tube mount and the mounting means so that an absorber tube is prevented from bending due to its own weight or the weight of the heat carrier medium. By means of the displaceable arrangement of the absorber tube it is ensured that a thermal expansion of the absorber tube is possible. In this manner, longer absorber tubes are also possible without requiring a connection between the absorber tube and the parabolic reflector. The absorber tube mount may be connected with the inner tube of the absorber tube, the sheathing tube being interrupted at that site. The sheathing tube parts may be sealed at the interruption site so as to allow for an evacuation of the gap.

The design of the parabolic trough collector module with at least one mounting means that connects the support device with at least one absorber tube mounts an independent inventive aspect which may be realized also without providing a linear bearing structure of the absorber tube on the support head.

Preferably it is provided that the mounting means is fastened to the support head above the linear bearing structure. Thus, the support head may extend vertically upward far beyond the absorber tube so that the mounting means can advantageously lead to the absorber tube holder, wherein the weight force of the absorber tube and of the heat carrier medium contained therein in operation may be transmitted onto the support head and thus onto the support device.

It may be provided in this regard that the mounting means is a tensioning means, e.g. a rope, a rod, a chain or a cable. Thus, the mounting means forms a bracing for the absorber holder. Here, the tensioning means may be arranged in the vertical absorber tube plane, i.e. the plane extending in the vertical direction through the centre axis of the absorber tube. As an alternative, it is possible to provide two tensioning means which respectively extend under an acute angle with respect to the absorber tube plane. In this manner, it is possible to achieve a lateral stabilization of the absorber tube holders so that the absorber tubes are prevented from bending sideways during thermal expansion.

In a preferred embodiment of the invention it is provided that the linear bearing structure has a linear bearing structure rail extending in the axial direction of the absorber tube, wherein a carriage connected with the absorber tube is guided on the linear bearing structure rail. In particular, the carriage may be connected with the inner tube of the absorber tube. In this manner a linear bearing structure can be provided in a structurally simple manner. Here, it may be provided that the carriage rolls or slides on the linear bearing structure rail. In particular it may be provided that the carriage is hung into the linear bearing structure rail so that the absorber tube is guided below the linear bearing structure rail and is suspended from the linear bearing structure rail via the carriage. Thereby, the weight force of the absorber tube and of the heat carrier medium contained therein in operation can advantageously be transmitted onto the support device.

Preferably it is provided that the absorber tube mount comprises an absorber tube mounting rail extending in the axial direction of the absorber tube, wherein a carriage is guided along on the absorber tube mounting rail, the carriage being connected with the absorber tube, e.g. with the inner tube. Thus, the absorber tube mount may be formed in a manner similar to the linear bearing structure. In this embodiment the mounting means connects the absorber tube mounting rail with the support device. The carriage of the absorber holder rolls or slides on the absorber tube mounting rail.

It may also be provided that the absorber tube mounting rail is supported by a plurality of mounting means that are connected to the support device. The mounting means are fastened to the absorber tube mounting rail at spaced link points so that the mounting means extend at different angles with respect to the rail. In this manner it is possible to realize relatively long absorber tube mounting rail s. In one embodiment of the invention it may be provided that the absorber tube mounting rail extends along the entire absorber tube length of a parabolic trough collector module. Here, the absorber tube mounting rail may be connected with the linear bearing structure rail. Accordingly, the linear bearing structure also forms the absorber tube holder, whereby a very stable linear bearing structure is obtained, while the thermal expansion of the absorber tube is not restricted in any respect, since the absorber tube can be displaced along the linear bearing structure rail or the absorber tube mounting rail in a quasi unrestricted manner. Here, in the region of the support device, the linear bearing structure rail may be fastened to the support device. With a rail extending over the entire tube length of the absorber tube, which rail forms both the linear bearing structure rail and the absorber tube mounting rail, it may also be provided that the rail is not fastened directly to the support, but that the entire rail is supported by a plurality of mounting means.

An absorber tube typically consists of an inner tube enclosed by a sheathing tube, e.g. a glass sheathing tube, transparent to solar radiation. The carriage(s) connecting the absorber tube with the linear bearing structure rail and/or the absorber tube mounting rail may e.g. be connected directly with the inner tube, the glass sheathing tube being interrupted and sealed in this region.

In a preferred embodiment of the invention it is provided that the radial bearing structure comprises a bearing structure housing connected to a support structure of the parabolic reflector. In this manner, the pivotable bearing structure of the parabolic reflector can be realized in an advantageous manner, while the weight of the parabolic reflector is transmitted onto the support device.

In this regard it may be provided that the support structure comprises a supporting strut connected to the bearing structure housing. The supporting strut may be provided e.g. at the end face of the parabolic reflector and may connect the longitudinal sides of the parabolic reflector with each other. The supporting strut thus quasi extends along the chord of the curvature of the parabolic reflector.

It may be provided that the support head has a recess extending orthogonally with respect to the absorber tube, in which recess the radial bearing structure is arranged and which comprises a passage tube extending in the axial direction of the absorber tube and partly passing through the recess, wherein a radial bearing of the radial bearing structure is arranged on the passage tube. In other words: The support of the parabolic reflector by means of the radial bearing structure is effected on the passage tube. The absorber tube or the absorber tube and the linear bearing structure are guided through the passage tube. In this manner a particularly stable radial bearing structure can be provided. Above the recess, the weight forces transmitted from the parabolic reflector onto the support device can be transmitted centrally onto the support device, thus forming an advantageous bearing structure. By providing the passage tube through which the absorber tube is guided, and by providing the radial bearing structure on the passage tube, it is further achieved in a structurally simple manner that the parabolic reflector can be pivoted about a rotational axis extending in the absorber tube.

Here, it may be provided that the supporting strut penetrates the recess and it may in particular be provided that the supporting strut rests on the radial bearing structure arranged in the recess. Thereby, weight forces of the parabolic reflector can be transmitted in an advantageous manner onto the support device via the radial bearing structure. It may further be provided that the recess causes a lateral guiding on the supporting struts, whereby it is avoided that axial forces are transmitted onto the radial bearing structure to an unallowable extent.

In an embodiment of the present invention that is an alternative to the embodiment featuring the recess in the support head, it may be provided that the radial bearing structure comprises a radial bearing structure fastened to the support head and comprises a hollow shaft guided in the radial bearing structure, the absorber tube or the absorber tube and the linear bearing structure being guided through the hollow shaft. Here, it may be provided that the linear bearing structure is supported via separate supports. Further, it may be provided that the supporting strut is connected with the hollow shaft.

The invention further relates to a parabolic trough collector unit comprising a plurality of parabolic trough collector modules of the present invention arranged in a row. In this regard it is provided that the parabolic trough collector modules comprise a common continuous absorber tube line formed by absorber tubes. A common continuous absorber tube line is understood as being a plurality of fixedly interconnected absorber tubes which—except for possible interruptions in the sheathing tubes—are uninterrupted, wherein the inner tubes being joined e.g. by flanges or by welding. The invention thus allows providing parabolic trough collector units having a perfectly continuous absorber tube line. In this manner, complicated connections of the absorber tubes are avoided which are otherwise used to connect two adjacent parabolic trough collector modules in order to absorb thermal expansions of the absorber tube or to compensate for differences in the pivoting of the absorber tubes with the associated parabolic reflectors.

Preferably it is provided in the parabolic trough collector unit of the present invention that two adjacent parabolic trough collector modules respectively have a common support device. The adjacent modules thus have a common linear bearing structure for the absorber tubes combined into an absorber tube line. Further, the mounting means of the adjacent parabolic trough collector modules engage the common support device from both sides. Since the weight forces of the absorber tubes to be absorbed are largely the same, the forces transmitted from the mounting means onto the support device in the axial direction of the absorber tube largely cancel each other out. Thus, the stability of the support device required for absorbing the weight forces is reduced so that the stability demands on the support device are also lower.

A parabolic trough collector unit may e.g. include between six and eighteen parabolic trough collector modules. The parabolic trough collector unit preferably includes fourteen parabolic trough collector modules. The parabolic trough collector unit may have a common drive for all parabolic trough collector modules comprised in the unit.

The invention further relates to a solar thermal power station with a plurality of parabolic trough collector units according to the invention which are arranged in a row. Here, it is provided that at least two adjacent parabolic trough collector units have a common continuous absorber tube line. The invention thus avoids high-cost apparatuses that have to be arranged between two parabolic trough collector units of conventional solar thermal power stations in order to compensate for different pivoting movements or thermal expansions of the absorber tubes or the absorber tube lines. Pressure and heat losses are reduced thereby. It may e.g. be provided that a plurality of parabolic trough collector units, e.g. six units, has a common continuous absorber tube line. With typical dimensions of the parabolic trough collector modules and the parabolic trough collector units, the continuous absorber tube line may be several hundred meters in length, e.g. even more than 1000 m, e.g. 1008 m. The absorber tube line is thus formed by a continuous tube composed of a plurality of absorber tubes. Owing to the linear bearing structure provided in each parabolic trough collector module of the solar thermal power station and to the special absorber tube mounting, thermal expansions of the continuous absorber tube line can be compensated easily, which expansions may amount to up to 6 m for an absorber tube line of about 1000 m in length. In such a design it may e.g. be provided that in a row of parabolic trough collector units a single fixed bearing structure is provided for the absorber tube line, e.g. at the support device arranged at the end of the row, so that thermal expansion occurs in one direction. In this case, a length compensation device for the absorber tube line will be necessary at the other end of the row of parabolic trough collector units. Of course, it is also possible that the fixed bearing structure is arranged at the centre of a row of parabolic trough collector units, wherein, upon thermal expansion, the absorber tube line will elongate in both directions from the centre. In this case, length compensation devices would have to be provided at both ends of the parabolic trough collector units arranged in a row. The length compensation device may e.g. be a device exerting a tensile force on the absorber tubes or the absorber tube line. The same may also be formed e.g. by a spring device or by a pull weight connected with the absorber tube line via two guide rollers. The exertion of a tensile force on the absorber tube prevents the absorber tube from bending sideways during the thermal expansion of the absorber tubes. The end of the absorber tube line is connected with a flexible connecting line or with a connecting line allowing an angular displacement. In this way, the length compensation device can be realized in a structurally simple manner with little effort regarding device technology.

The design of parabolic trough collector modules and parabolic trough collector units according to the present invention even allows forming rows of parabolic trough collector units of more than 1000 m in length, e.g. up to 2 km. The only limit is the length compensation of the absorber tubes to be absorbed at the end or at both ends of the row.

The invention will be explained hereunder in detail with reference to the following Figures.

Figure 4:
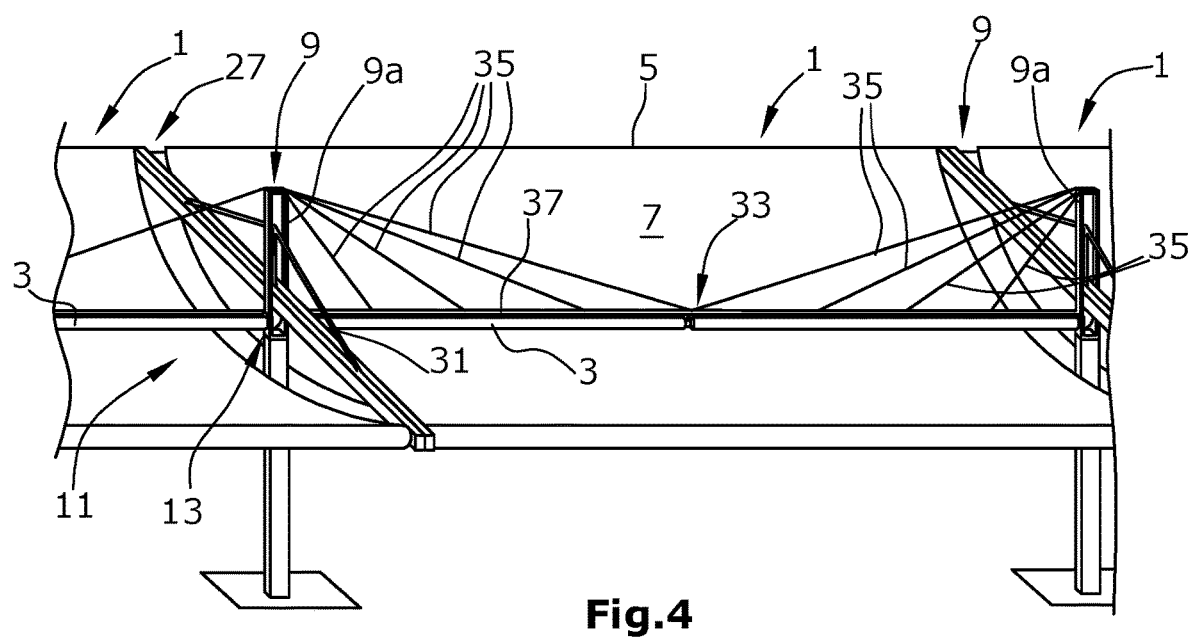
Figure 5:
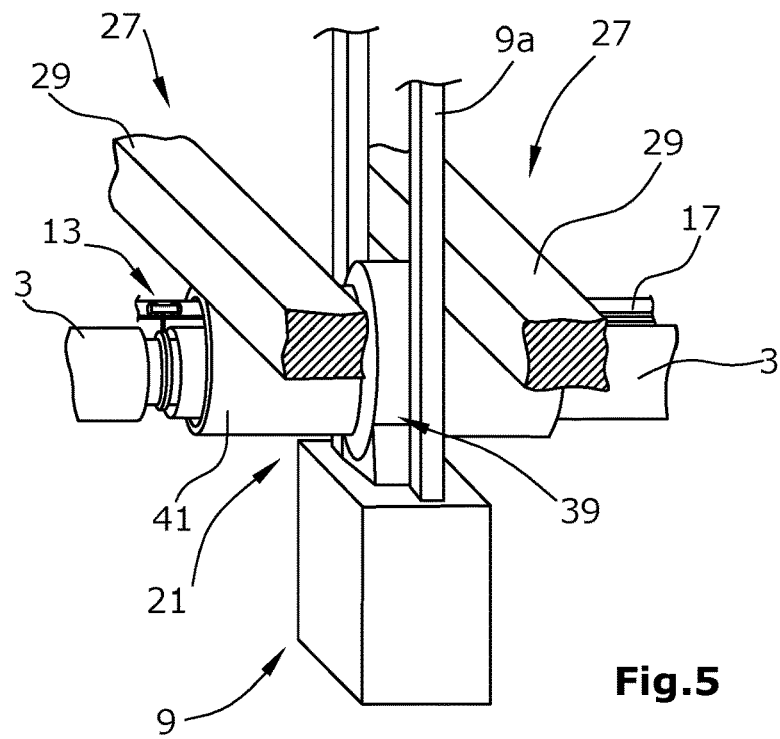
Figure 6:
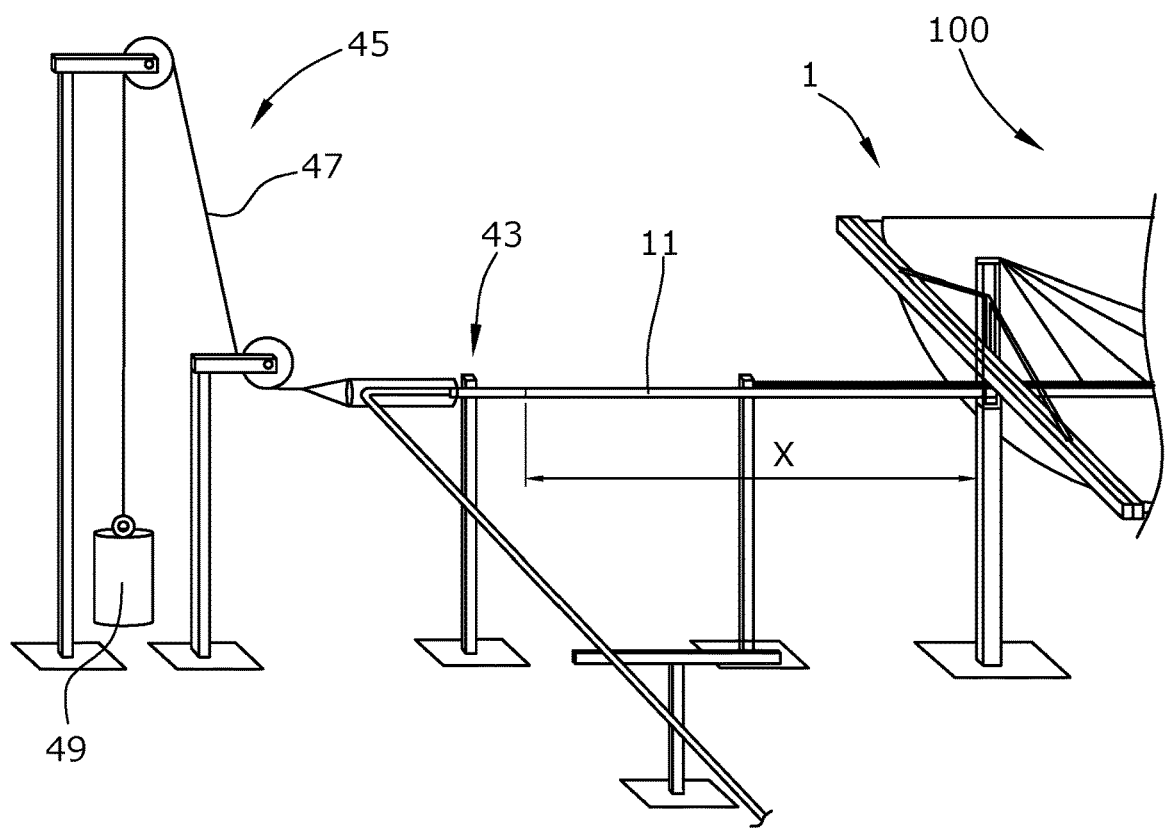

In the Figures:

FIG. 1 is a schematic perspective illustration of a row of parabolic trough collector modules according to the invention, FIG. 2a illustrates a detail of the linear bearing structure of the absorber tube and of the radial bearing structure of the parabolic reflectors in FIG. 1, FIG. 2b illustrates a detail of the absorber tube mount in FIG. 1, FIG. 3 shows an alternative embodiment of a parabolic trough collector module according to the invention, FIG. 4 shows a second alternative embodiment of a parabolic trough collector module according to the invention, FIG. 5 illustrates a detail of an alternative embodiment of the radial bearing structure at the support device, and FIG. 6 is a schematic illustration of a length compensation device of a solar thermal power station according to the invention.

FIG. 1 schematically shows a parabolic trough collector module 1 according to the invention in perspective view. A plurality of the parabolic trough collector modules 1 according to the invention may be arranged in a row as indicated in FIG. 1. A plurality of the parabolic trough collector modules 1, e.g. fourteen, forms a parabolic trough collector unit 100. A plurality of parabolic trough collector units 100 formed by parabolic trough collector modules 1 according to the invention may be arranged in a row. For example, six parabolic trough collector units according to the invention arranged in a row form a so-called parabolic trough collector of a solar thermal power station according to the invention. A solar thermal power station according to the invention may be comprised of a plurality of parabolic trough collectors assembled in this manner.

Typically, the parabolic trough collectors are oriented in a north/south direction.

Each parabolic trough collector module 1 according to the invention comprises an absorber tube 3. By means of a parabolic reflector 5 which has a reflector surface 7, solar radiation can be reflected onto the absorber tube 3. The parabolic trough collector module 1 has two support devices 9 on which the parabolic reflector 5 is pivotably supported. Two adjacent parabolic trough collector modules 1 share a support device 9.

The absorber tubes 3 of the adjacent parabolic trough collector module 1 are connected into an absorber tube line 11.

The absorber tubes 3 or the absorber tube line 11 are mounted on the support devices 9 by a linear bearing structure 13 forming a linear guide. The linear bearing structure 13 is shown in detail in FIG. 2a.

The support device 9 has a support head 9a which, as best seen in FIG. 1, protrudes beyond the reflector surface 7 in the vertical direction. In this manner, the absorber tube 3 extending above the reflector surface 7 can be mounted advantageously in the support head 9a.

The linear bearing structure 13 is formed by a linear bearing structure rail 15 arranged above the absorber tube 3 and in parallel with the absorber tube 3. A carriage 17 is guided on the linear bearing structure rail 15, which rolls on the linear bearing structure rail 15 by means of rollers. The absorber tube 3 is connected with the carriage 17 and is suspended from the linear bearing structure rail 15 by means of the carriage 17 so that the absorber tube 3 hangs below the linear bearing structure rail 15.

The support head 9a has a recess 19 extending in a direction orthogonal to the absorber tubes 3. A radial bearing structure 21 is arranged in the recess 18 for a pivotable mounting of the parabolic reflector 5. The radial bearing structure 21 is mounted on a passage tube 23 of the support head 9a. The passage tube 23 extends in the axial direction of the absorber tube 3 and penetrates the recess 19. The absorber tube 3 is guided through the passage tube 23. Further, the linear bearing structure rail 15 of the linear bearing structure 13 is fastened in the absorber tube 3. By means of such a structure, a fastening of the linear bearing structure 13 to the support head 9a is provided in a simple manner, while a pivotable bearing structure of the parabolic reflector 5 about an rotational axis can be achieved that coincides with the centre axis of the absorber tube 3.

The radial bearing structure 21 has a bearing structure housing 25 connected with the support structures 27 of the parabolic reflectors 5 of the adjacent parabolic trough collector modules 1. For this purpose, the support structures 27 each have a supporting strut 29 arranged at the end face of the parabolic reflector 5. Here, the supporting struts 29 connect the longitudinal sides of the parabolic reflector 5. The supporting struts 29 are guided through the recess 19 in the support head 9a and extend above the radial bearing structure 21.

The support structure 27 can, as best seen in FIG. 1, comprise additional struts 31 to increase the stability of the support structure. The struts 31 are not illustrated in FIG. 2a for reasons of clarity.

The recess 19 in the support head 9a is dimensioned such that sufficient space is available for the additional struts 31, as well as for the supporting struts 29 during the pivoting of the parabolic reflector 5.

In order to bear the weight of the absorber tube 3, the parabolic trough collector module 1 has an absorber tube mount 33 arranged at the centre of the absorber tube 3. The absorber tube mount 33 is connected with the support heads 9a of the support devices 9 by mounting means 35. The mounting means 35 may e.g. be ropes so that the absorber tube mount 33 is anchored at the support heads 9a. The absorber tube mount 33 is illustrated in detail in FIG. 2b. The absorber tube mount has an absorber tube mounting rail 37 extending in the axial direction of the absorber tube 3, the ends of the rail each having contact points for the mounting means 35. The absorber tube mounting rail 37 linearly guides a carriage 17 that is connected to the absorber tube 3. The carriage 17 is guided on the absorber tube mounting rail 37 in the same manner as for the linear bearing structure 13.

Using the absorber tube mount 33, the absorber tube 3 can be mounted independently from the parabolic reflector 5.

As can be seen best from FIGS. 2a and 2b, the absorber tubes 3 are formed by an inner tube 3a and a sheathing tube 3b that is transparent to solar radiation. In operation, a heat carrier medium is supplied through the inner tube 3a.

The carriages 17 of the linear bearing structure 13 and of the absorber tube mount 33 are connected with the inner tube 3a. The sheathing tube 3b is interrupted at that site. In order to be able to evacuate the gap formed between the sheathing tube 3b and the inner tube 3a, parts of the sheathing tube 3b are sealed at the interruption site.

The linear bearing structure 13 and the absorber tube mount 33 allow a linear movement of the absorber tube 3 in the axial direction. Thus, thermal expansions of the absorber tube 3 can occur without allowing the absorber tube 3 to become warped or to bend.

FIG. 3 illustrates an alternative embodiment of parabolic trough collector modules 1 according to the invention. In this embodiment, the upper end of the support head 9a is provided with a holder 5b extending orthogonally to the absorber tube 3, a plurality of mounting means 35 being fastened thereto. The holding means 35 thus extend under an angle with respect to a vertical plane extending through the centre axis of the absorber tube 3. The mounting means 35 thus engage the absorber tube mount 33 from above and from the side so that transversal forces acting on the absorber tube 3 can also be absorbed by the mounting means 35 in an advantageous manner. Thereby, an absorber tube 3 can be prevented from bending sideways during thermal expansion.

A second alternative embodiment of parabolic trough collector modules 1 according to the invention is illustrated in FIG. 4. In this embodiment, the linear bearing structure rail 15 extends along the entire length of the absorber tube 3 and thus forms the absorber tube mounting rail 37 of the absorber tube mount 33. A plurality of mounting means 35 connects this rail with the support heads 9a of the support devices 9. Such a design has the advantage that a great number of parabolic trough collector modules 1 can be arranged in a row, the modules having a common absorber tube line 11 formed by the absorber tubes 3. Due to the linear bearing structure rail 15, which forms the absorber tube mounting rail 37 and extends over the entire distance, the carriages 17 connected with the absorber tube 3 can be displaced randomly so that the thermal expansion of the absorber tube 3 can occur in any length. Thus, an absorber tube line 11 with a length of several 100 m can be used, for instance, in which a thermal expansion of several meters can occur.

FIG. 5 shows an alternative design of the radial bearing structure of the parabolic reflector 5. In this embodiment the supporting struts 29 are guided laterally past the support head 9a. A radial bearing 39 is arranged at the support head 9a. The radial bearing 39 rotatably supports a hollow shaft 41 on the support head 9a. The supporting struts 29 of the supporting structures 27 are fastened at the hollow shaft 41.

The absorber tube 3 and the linear bearing structure rail 17 are guided through the hollow shaft 41. In such an embodiment the linear bearing structure rail 17 has to be designed with such a length that it can be supported by holding means 35, or a separate holder, not illustrated in FIG. 5, has to be provided.

FIG. 6 schematically illustrates the end of a collector formed by a plurality of parabolic trough collector units 100. The absorber tube line 11 protrudes beyond the last parabolic trough collector module 1 by a distance X. A connecting tube 43 is connected to the absorber tube line 11, which connecting tube allows a length variation of the absorber tube line 11. This may be effected e.g. by an angular adjustment of the connecting tube 43.

A length compensation device 45 is connected to the connecting pipe 43, which device exerts a pulling force on the absorber tube line 11 via a rope pull 47 and a weight 19. In this manner it is achieved that upon an elongation of the absorber tube line 11, the elongation occurs in a linear direction and that no bending of the absorber tube line 11 can occur.

Using the parabolic trough collector modules 1 according to the invention, collectors of several hundred meters in length can be formed which are stable and can be manufactured at low cost, since complex connections, such as ball joints, can be omitted. In addition, since a continuous absorber tube line 11 can be provided, pressure and heat losses can be reduced.

The invention claimed is:

1. A parabolic trough collector module comprising:
an absorber tube, a parabolic reflector focusing the solar radiation to the absorber tube and having a reflector surface, and at least one support device on which the parabolic reflector is pivotably mounted, wherein
the at least one support device further comprises a support head projecting over the reflector surface in the vertical direction, on which the absorber tube is mounted by a linear bearing structure forming a linear guide, wherein the linear bearing structure comprises a linear bearing structure rail secured orthogonally to the support head in an axial direction of the absorber tube and a carriage connected to the absorber tube, wherein the carriage is guided on the linear bearing structure rail and mounts the absorber tube to the linear bearing structure rail,
wherein the parabolic reflector is pivotably supported on the support device by means of a radial bearing structure, the radial bearing structure being arranged around the absorber tube and linear bearing structure rail.

2. The parabolic trough collector module of claim 1, wherein the support device is connected with at least one absorber tube mount by at least one mounting means, the absorber tube mount being arranged at a section of the absorber tube located above the reflector surface and forming a fastening of the absorber tube that is displaceable in the axial direction of the absorber tube with respect to the absorber tube.

3. The parabolic trough collector module of claim 2, wherein the mounting means is fastened to the support head above the linear bearing structure.

4. The parabolic trough collector module of claim 3, wherein the mounting means is a tensioning means.

5. The parabolic trough collector module of claim 2, wherein the absorber tube mount comprises an absorber tube mounting rail extending in the axial direction of the absorber tube, a carriage connected to the absorber tube being guided on the absorber tube mounting rail.

6. The parabolic trough collector module of claim 1, wherein the radial bearing structure comprises a bearing structure housing connected to a support structure of the parabolic reflector.

7. The parabolic trough collector module of claim 6, wherein the support structure comprises a supporting strut connected to the bearing structure housing.

8. The parabolic trough collector module of claim 7, wherein the support head has a recess extending orthogonally with respect to the absorber tube, in which recess the radial bearing structure is arranged, and comprises a passage tube extending in the axial direction of the absorber tube and passing through the recess, a radial bearing of the radial bearing structure being arranged on the passage tube.

9. The parabolic trough collector module of claim 8, wherein the supporting strut penetrates the recess.

10. The parabolic trough collector module of claim 7, wherein the radial bearing structure comprises a radial bearing fastened to the support head and a hollow shaft guided in the radial bearing, the absorber tube or the absorber tube and the linear bearing structure being passed through the hollow shaft.

11. The parabolic trough collector module of claim 10, wherein the supporting strut is connected to the hollow shaft.

12. A parabolic trough collector unit with a plurality of parabolic trough collector modules of claim 1, wherein the parabolic trough collector modules comprise a common continuous absorber tube line of absorber tubes.

13. The parabolic trough collector unit of claim 12, wherein a common support device is arranged between two respective adjacent parabolic trough collector modules.

14. A solar thermal power station with a plurality of parabolic trough collector units according to claim 12,
wherein at least two adjacent parabolic trough collector units have a common continuous absorber tube line.

* * * * *